Figure 1:
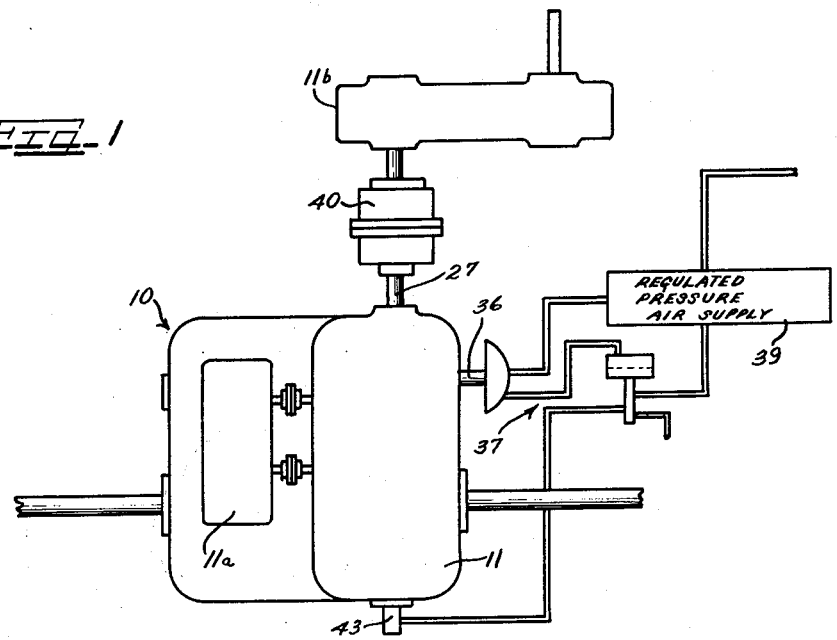

March 31, 1964  E. J. JUSTUS ETAL  3,126,761
TORQUE LIMIT CONTROL

Filed Jan. 21, 1958  3 Sheets-Sheet 1

INVENTORS
EDGAR J. JUSTUS
EDWARD D. BEACHLER

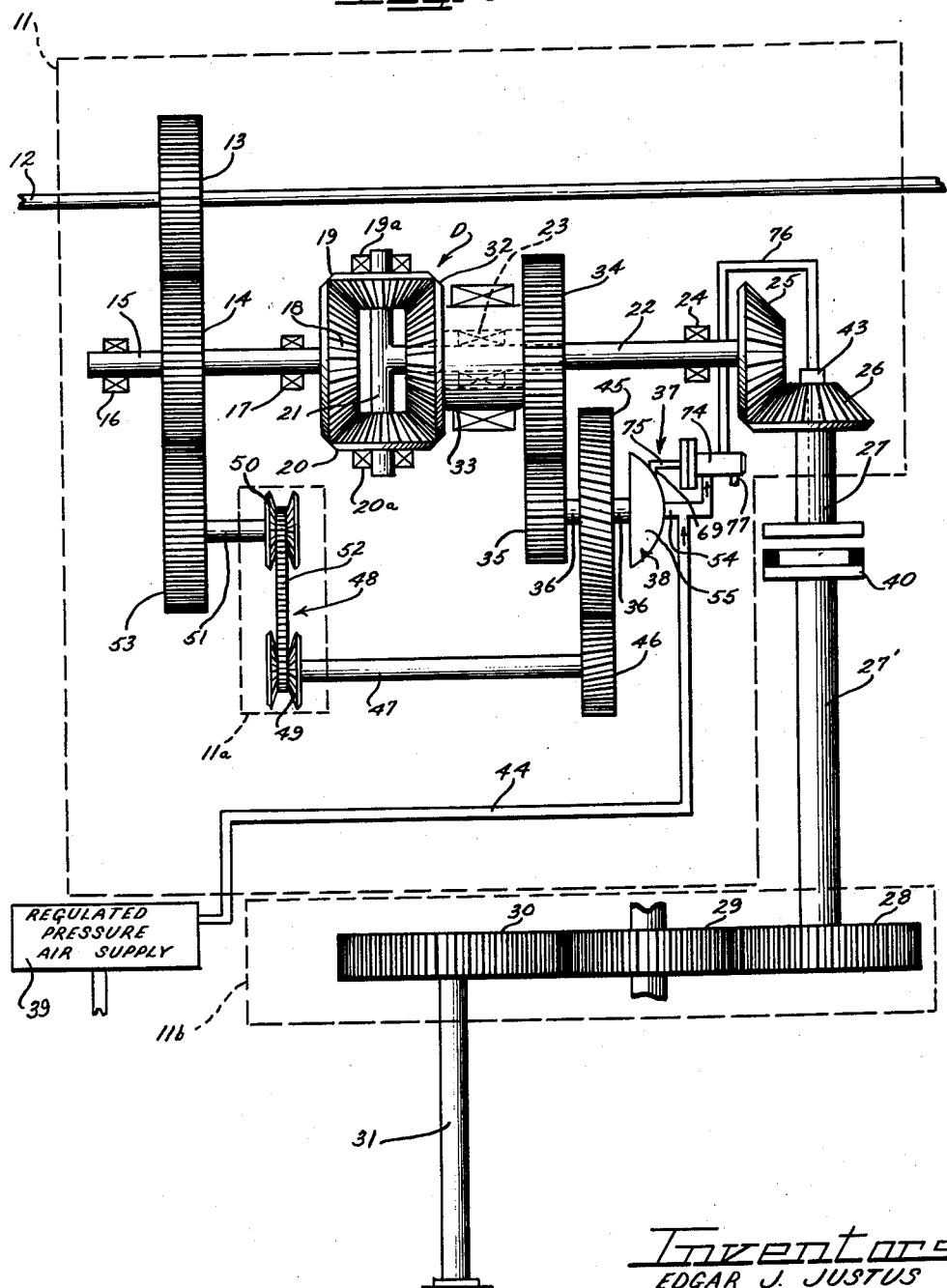

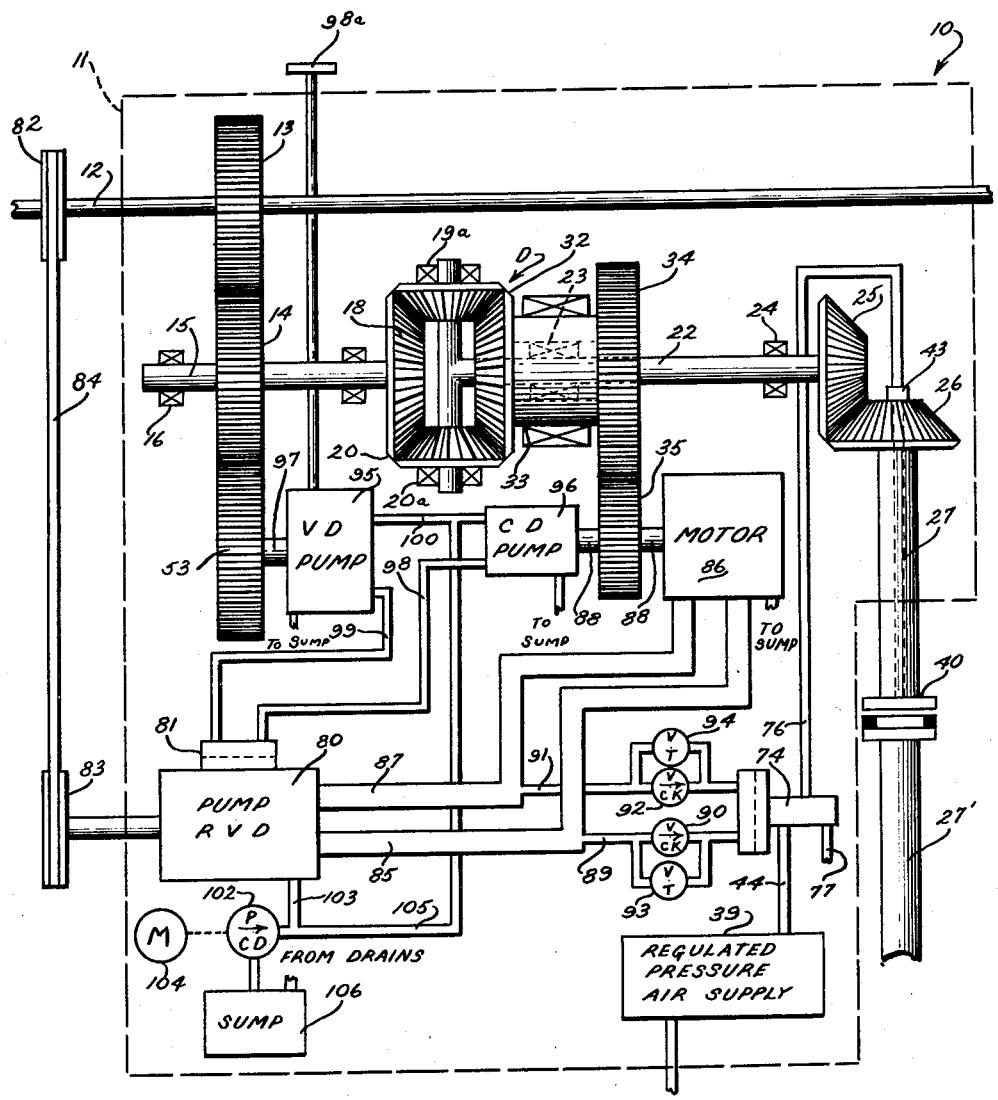

United States Patent Office 3,126,761
Patented Mar. 31, 1964

3,126,761
TORQUE LIMIT CONTROL
Edgar J. Justus and Edward D. Beachler, Beloit, Wis., assignors to Beloit Iron Works, Beloit, Wis., a corporation of Wisconsin
Filed Jan. 21, 1958, Ser. No. 710,324
21 Claims. (Cl. 74—687)

The instant invention relates to a torque control for a drive mechanism, and more specifically to an improved drive mechanism for a paper making machine wherein an improved clutch control is incorporated.

Although the principles of the present invention may be included in various drive mechanisms, a particularly useful application is made in mechanisms of the heavy duty type such as are utilized to drive paper making machinery. The instant invention overcomes the serious difficulties which are encountered when fluid-operated clutches fail to slip on the occurrence of an overload, or where they slip prematurely, either of which is damaging to the unit protected by the clutch, or to the clutch itself. In paper making machinery, the large connected mass and inertia requires that acceleration be very carefully controlled to limit overloads to values which do not damage the drive units, and the usual practice is to permit the clutch to slip during acceleration, but to apply full pressure and to tightly engage the clutch during the periods of steady operation.

The usual control of fluid-actuated clutches is through direct manual valves or remotely actuated valves or by such devices as time delay relays. None of these are specifically related to the reason for limiting the operating fluid pressure, which is the torque which the unit is able to endure.

This invention provides clutch control which is directly related to the torque load in accelerating each or all of the units of a paper making machine. Therefore, maximum acceleration permissible is obtained without destructive overloads on any units, and the clutch is permitted to be tightly engaged or locked up at all times when the torque is within predetermined limits.

While the instant invention has particular utility when used in paper making machinery, it is to be understood that mention thereof is illustrative, and that the invention has application in other machinery, particularly heavy-duty machinery.

The instant invention contemplates the sensing of input or reactive torque and obtaining a control signal. The control signal is then applied to regulate or vary the engaging force or pressure in the clutch, thereby varying its torque transmitting capacity.

Accordingly, it is an object of the present invention to provide a drive mechanism having a clutch, the torque transmitting capacity of which is controlled.

Another object of the present invention is to provide a drive mechanism for a paper machine wherein the torque transmitting capacity of the drive mechanism is automatically regulated.

Yet another object of the present invention is to provide a method and means for controlling the torque capacity of a driven clutch.

Many other advantages, features and additional objects of the present invention will become manifest to those versed in the art upon making reference to the detailed description and accompanying sheets of drawings in which preferred structural embodiments incorporating the principles of the present invention are shown by way of illustrative example.

Figure 3:
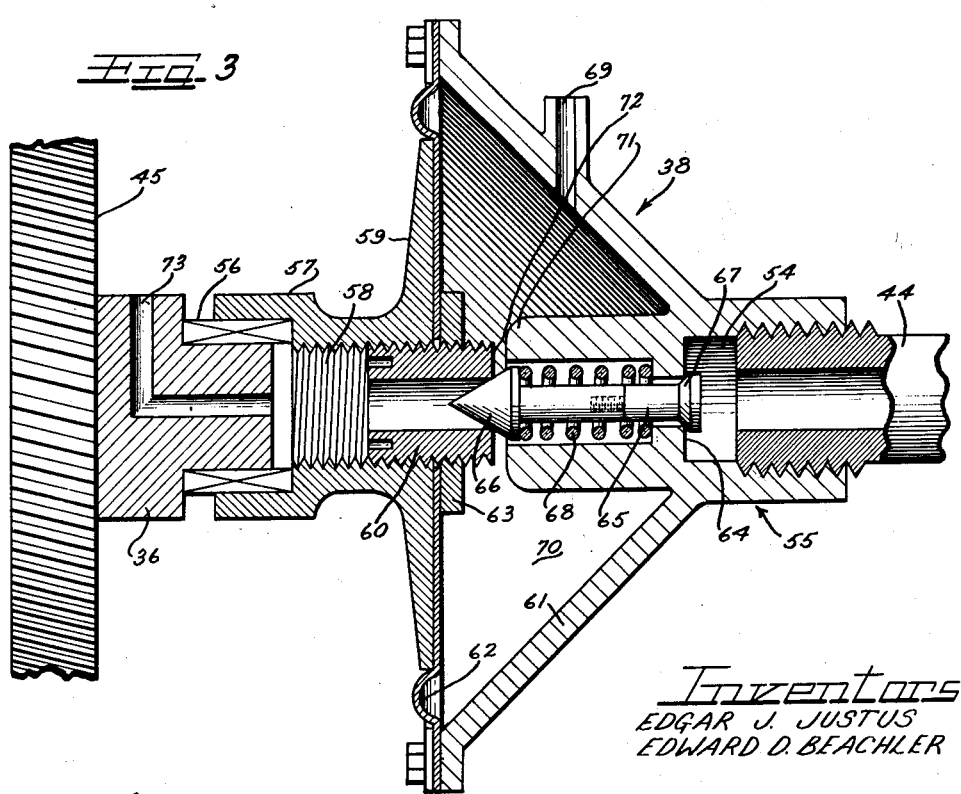

On the drawings:
FIGURE 1 is a top view, partly schematic, of a drive mechanism provided in accordance with our invention;
FIGURE 2 is a top plan view, with parts shown diagrammatically, of a paper machine drive embodying the instant invention, and shown in FIG. 1;
FIGURE 3 is a greatly enlarged view of an element included in FIG. 1; and
FIGURE 4 is a top plan view, with parts shown diagrammatically, of another embodiment of our invention incorporated in a paper machine drive.

As shown in the drawings:
Referring to FIGURE 1, the reference numeral 10 indicates generally a paper machine drive mechanism comprising a differential housing 11, mounting thereon a cone pulley or variable speed drive housing 11a, and having adjacent thereto a gear train housing 11b connected to the differential housing 11 by means of a fluid operated clutch 40.

A set of clutch controls generally indicated by the numeral 37 communicates with a regulated pressure fluid supply 39, with one of the moving elements 36 within the differential drive housing 11, and with a rotary seal 43 through which pressurized fluid is transmitted, via a hollow shaft 27 to the clutch 40.

Referring now to FIGURE 2, there is shown a diagrammatical representation of the principal elements of the drive mechanism 10. For a more complete teaching of how these components may be constructed and assembled into the housing 11, reference may be had to the United States Patent No. 2,514, 240, issued July 4, 1950 to Lloyd Hornbostel. In this figure, the housings 11, 11a, and 11b have been indicated diagrammatically by heavy dashed lines. It is to be understood that various components or elements of this invention may be disposed within the housing, secured externally to the housing, or be provided remotely therefrom.

The housing 11 encloses a portion of a line shaft 12 which corotatably mounts the gear 13. The gear 13 meshes with and drives a second gear 14 corotatably mounted on a shaft 15 that is mounted for rotation on bearings 16 and 17 (shown diagrammatically). For the sake of simplicity, most of the bearings within the housing 11 have been omitted, and those that are shown are indicated diagrammatically only.

The shaft 15 corotatably mounts the first of three rotary elements of a differential gearing assembly indicated generally by the reference letter D. The first rotary element is a gear 18. The second rotary element in the differential gearing assembly D comprises opposed beveled pinions 19 and 20 rotatably carried on a frame or rack 21 which are each meshed with the beveled gear 18. The frame 21 forms with a shaft 22 a T-shaped arrangement whereby the pinions 19 and 20 are rotatably carried at extremities of the arms of the T and are rotatable about the stem 22 of the T.

As will be noted, the stem or shaft 22 is mounted for rotation on a pair of bearings 23 and 24, and the shaft 22 carries a pinion 25 that meshes with and drives a pinion 26 on still another shaft 27. Power is transmitted from the shaft 27 through the clutch 40 and through a series of gears 28, 29 and 30 to a load connected to a shaft 31. Further details of the gear train 28, 29 and 30, and the load shaft 31 are not necessary for the purposes of the instant invention, but it is sufficient to know that this arrangement is old and well known in the art.

As will be noted, the pinions 19 and 20 are corotatably mounted on bearings 19a and 20a on the frame element 21 and these gears 19 and 20 mesh with a beveled pinion 32 which forms the third rotary element of the differential gear assembly D. The beveled gear 32 is corotatably mounted on a sleeve 33 (which is also mounted for rotation from the bearing 23) which carries another gear 34 corotatably mounted on the sleeve 33. The gear 34 meshes with a gear 35 mounted on a separate shaft 36. The shaft 36 also corotatably mounts another gear 45.

Such other gear 45 meshes with and is driven by a gear 46 on still another shaft 47 connected with the cone pulley within the variable speed housing 11a. As shown in the housing 11a, the shaft 47 is connected to a variable speed-ratio device indicated generally by the reference numeral 48 which may be any conventional speed varying apparatus, or as here shown for purposes of simplicity, an arrangement comprising a tooth-faced variable effective diameter pulley 49 corotatably carried on the shaft 47, and a similar pulley 50 corotatably mounted on another shaft 51, plus a suitable belt or chain 52 operatively and positively connecting the pulleys 49 and 50.

Power for the variable speed-ratio device 48 is obtained through a gear 53 which meshes with and is driven by the gear 14. The gear 53 drives the pulley 50, which in turn drives the pulley 49 through the belt 52, which elements may be varied in position so as to obtain the desired speed differential between the shafts 47 and 51. The gear system 45 and 46 then driven by the shaft 47 effects the desired speed in the shaft 36, and in this way the necessary torque is supplied to the gear 32.

Thus the drive mechanism 10 is a gear type of mechanism which includes two coacting branches, one of which feeds power through the beveled gear 18 or first rotary element of the differential drive D and the second of which branches feeds power through the variable speed drive and the shaft 47 to the control gear 34. Since the gear 46 is somewhat smaller than the gear 45, and since the gear 35 is somewhat smaller than the gear 34, it can be seen that both input speed and torque are somewhat lesser in the branch having the variable speed-ratio device 48.

The clutch 40 is a conventional clutch, for example a fluid pressure actuated clutch, which in this example is held normally engaged by pneumatic pressure.

The mechanism also includes a control for the clutch 40 which includes a means, generally indicated by the numeral 37, responsive to torque and operative on the clutch to vary the torque transmitted thereby.

The control 37 includes a means 38 which generates a signal which is a function of the torque transmitted by the mechanism 10. The control unit 38 is rigidly disposed wth respect to the housing 11 and is associated with the end of the shaft 36 which has a slight amount of axial freedom. The gears 45 and 46 have helical teeth so that when a torque is transmitted by the mechanism, the shaft 36 is axially displaced toward the control 38. The amount of axial shift is a function of the torque transmitted by one branch of the drive mechanism 10.

Various devices may be used as the control 38. In order that the operation of this invention may be fully understood, a representative control device is shown as FIGURE 3 hereof. It is to be understood that the details of this control do not form a part of the instant invention and are also partly diagrammatic. The instant control 38 operates on a regulated pressure air supply 39, but it is to be understood that other fluid means may also be efficiently utilized for the present purpose. The air supply 39, as shown in FIGURE 2, communicates with a line 44, which leads to an inlet port 54 on the control 38 as best seen in FIGURE 3. The control 38 has a housing 55 which is rigidly mounted with respect to the housing 11. The shaft 36 is rotatably mounted by any conventional means (not shown) while one end of it is in engagement with a thrust bearing 56 received in a cup like member 57 having a hollow threaded bore 58 and a flange 59. Within the hollow threaded bore 58, there is threadably received an adjustable annular valve seat 60. The housing 55 has a generally cup shaped portion 61 into which the valve seat 60 projects. A diaphragm 62 is supported at the periphery of the cup shaped portion 61 and is clamped thereto by any convenient means. The central portion of the diaphragm is further supported by the flange portion 59 of the cup shaped member 57. If desired, a locking means 63 may be used to seal the threaded connection and to hold the diaphragm 62 securely in place.

Adjacent to the inlet port 54 of the housing 55 there is a seat 64 defining an aperture, the seat being in fixed relation to the housing 55. A valve stem 65 extends through the opening of the seat 64, the valve stem 65 being of any construction, such as of two pieces which are threaded together. The stem 65 has a sealing surface 66 which engages with the annular valve seat 60, and a second sealing surface 67 which sealingly engages with the seat 64. A spring 68 urges the sealing surfaces 66 and 67 against the respective seats and slightly displaces the diaphragm 62 in an outward direction.

When air is admitted through the line 44, it is blocked by the valve stem 65 at the seat 64. Thus no air can pass through an outlet port 69. When the gear mechanism transmits torque, the shaft 36, acting through the thrust bearing 56, the cup like member 57, and the seat 60, displaces the valve stem 65 from the seat 64 to admit air into the chamber 70, thus producing the reactive force directed against the diaphragm 62 to oppose further axial displacement of the shaft 36. This condition also allows fluid to pass from the chamber 70 through the port 69 for control purposes explained hereafter. A pair of shoulders 71 and 72 are engageable with each other to limit the axial movement of the shaft 36.

If the pressure in the chamber 70 is sufficiently high to close the valve at the seat 64, and to open it at the seat 60, the air passes through the seat 60 and through a vent passage 73 in the shaft 36 to relieve the fluid pressure from the chamber 70 and from the port 69.

Accordingly, the adjustable seat 60 may be preset to a position whereby a pre-selected amount of axial displacement of the shaft 36 causes the engagement and disengagement of the stem 65 at its pair of seats. Thus a given amount of torque may be allowed to be transmitted by the gear 45 before a pressure control signal calling for a change appears at the port 69. It can be seen that as the diaphragm moves toward the valve stem, a throttling will also occur at the shoulders 71 and 72. Within the limits of shaft movement, there will also be a point of equilibrium within the control 38. For a certain torque on the gear 45, the axial thrust in the shaft 36 will be balanced by the dynamic pressure of air acting on the diaphragm and flowing through the seat 60 and the vent passage 73. The pressure at port 69, if blocked externally represents a static pressure.

Referring again to FIGURE 2, the line 44 thus provides fluid pressure to the control 38 and also to the slide valve of a diaphragm operated relay valve or clutch control member 74.

The port 69 is connected by a line 75 to the diaphragm of the valve 74 which valve permits passage of fluid pressure from the line 44 to the line 76. The line 76 passes through the rotary shaft seal 43 and the hollow shaft 27 to the fluid actuated clutch 40. When the static pressure in the line 75 changes due to a change in the transmitted torque, the spool in the valve 74 shifts and thereby closes off the fluid supply from the line 44, and allows fluid from the line 76 to bleed out through a vent 77.

Referring now to the initial operation of the differential gearing assembly D, it will be appreciated that the line shaft 12 is connected to the first rotary element 18 and rotates the same through the gears 13, 14. If the beveled pinion 32 is prevented from rotating at the same speed as the beveled pinion 18, the rotation of the gear 18 will cause rotation of the frame 21 by the gears 19 and 20, so as to effect corresponding rotation of the shaft 27 which is directly connected to the clutch 40.

It will now be appreciated that the control 38 produces a dynamic fluid pressure signal which is infinitely variable and which is a function of the torque transmitted. Further, the valve 74 together with its lines and pressure source comprises a means for converting the dynamic signal into a static signal which in effect directs the torque signal to the clutch for varying the torque transmitting capacity. Since the controls are each of the modulating type, the amount of compensation or correction is proportional to the torque.

In the instant embodiment, it is desired to allow the clutch 40 to slip in the event that there be excessive input or reactive torque. Accordingly, the valve 74 is so arranged that with little or no torque, or with less than critical torque present, there will be negligible displacement and hence there will be locking up of the clutch 40. However, as the transmitted torque increases from this level, a higher pressure signal is transmitted by the line 75 to the relay 74 which higher signal causes the source of clutch pressure to be closed off. Also, the pressure in the clutch thereby is allowed to gradually bleed or vent whereby the clutch becomes partially unloaded. Thus, above a predetermined level, the unloading becomes an inverse function of torque. The relay valve 74 typically includes an adjustable spring biased so that normal operating pressure is applied to the clutch unless and until the torque signal exceeds a preset bias, at which time the diaphragm of the valve 74 displaces the spool thereof to permit the bleed off of the fluid pressure from the clutch operating pressure line 76. Thus the torque load on the differential drive unit is thereby reduced and held at or below its maximum value during the acceleration of the connected load. Thus the valve 74 comprises a means responsive to a variable fluid pressure signal for decreasing the fluid actuating pressure with an increase in a fluid pressure signal, and for increasing the fluid actuating pressure in the clutch as a function of a decrease in fluid pressure signal.

Referring now to FIGURE 4, there is shown a further embodiment of the instant invention. Certain portions of this embodiment are identical to that shown in FIGURE 2 and identical numbers have been utilized to identify them. In this embodiment, the cone pulley type of variable speed drive 48 and the control element 38 have been omitted, and in their place, a fluid type of variable speed drive and control has been provided.

In this form of the invention, a source of fluid pressure has been provided, here indicated as being a variable displacement pump 80 having a pressure responsive delivery control, access to which is made through a chamber 81. The pump 80 is driven by the line shaft 12 in any convenient manner, here illustrated as being by a pair of pulleys 82 and 83 interconnected by a belt 84. The output of the pump 80 is directed through a line 85 to a fluid motor 86 after which it is returned through a line 87 to the pump 80. It is to be understood that the pump 80 is reversible and therefore that line 87 may comprise the discharge line, line 85 being the return line. The motor 86 is connected to a shaft 88 on which the gear 35 is carried. Thus the pump 80 receives power from the line shaft 12 and drives the motor 86 to apply torque to the control gear 34. Certain portions of the structure represented by this figure, and the operation thereof, are also shown and described in the above identified patents.

The amount of torque being applied by the motor 86 to the gear system is a function of the fluid pressure drop across such motor. Assuming that line 85 is the high pressure line, a line 89 carries the input pressure through a check valve 90 to the diaphragm chamber of the relay valve 74. A second line 91 from the return line 87 is also connected to the diaphragm chamber of the relay valve 74 via a check valve 92. However, the higher pressure from the line 85 tightly closes the check valve 92. Accordingly, a pair of throttling valves or bleed valves 93 and 94 have been provided, each encircling one of check valves 90 and 92 respectively. When the line 85 is the high pressure line, the position of the valve 93 is immaterial, but the valve 94 is held to a barely cracked or open position, whereby the pressure difference between the line 85 and 87 or pressure drop across the motor 86 also appears across the valve 94. The return line pressure typically being quite constant, the diaphragm in the relay valve 74 in effect senses the pressure drop across the motor 86 and regulates the flow of fluid to the clutch 40 accordingly. Thus, typically, when the torque across the motor is high, air will be bled from the line 7 through the vent 77, and if the torque be low, it will be admitted from the regulated pressure air supply 39 through the line 44 to the line 76. Of course, when the pump 80 is operated in the reverse direction, the pressure drop across the motor 86 appears across the valve 93, and is nevertheless sensed by the relay valve 74. Accordingly, there is a flow through the lines 89 and 91 via the relay valve 74, which flow is a dynamic flow or signal, and which is converted by the relay valve 74 to a static signal. Thus the valves and tubing described are responsive to torque and operative on the clutch 40 to vary its torque capacity.

A further regulation of torque for the protection of the clutch may also be accomplished. To this end, we have provided a pair of control pumps 95 and 96. The control pump 95 is driven through a shaft 97 on which the gear 53 is mounted, and is a variable delivery or adjustable delivery pump. Thus the pump 95 has a manual control 98a which may extend externally of the housing 11 for adjusting its displacement per revolution. The control pump 96 is driven by the shaft 88 along with the gear 35. The pumps 95 and 96 are interconnected so that the flow from the pump 96 passes through a line 98 leading to the control chamber 81 of the pump 80 which chamber in turn communicates by a line 99 with the pump 95. A line 100 interconnects the pumps 95 and 96.

The pump 95 is initially adjusted so that the pumps 95 and 96 pump at the same rate, circulating fluid through the lines 98, 99 and 100. Ordinarily, the pump 96 will be rotating at a somewhat slower speed than will the pump 95. For the condition of matched outputs, a given pressure exists in the control chamber 81 which positions the control ring (not shown) of the pump 80 such that its delivery will drive the motor 86 at the proper speed. However, if the pump 96 should lead the pump 95, the pressure will build up in the chamber 81 causing the pump 80 to reduce its output thereby slowing down the motor 86 and the pump 96 to a point where it no longer leads the pump 95. Conversely, should the pump 96 lag behind the pump 95, the pressure in chamber 81 will decrease whereby the pump 80 delivers an increased output which increases the speed of the motor 86 and the pump 96 to a point where the outputs of the pumps 95 and 96 are again matched.

Another way which the operation of the pumps 95 and 96 may be explained is as follows:

The pump 95 is driven at a variable speed determined by the speed of the line shaft 12. For any desired speed ratio between the line shaft 12 and the output shaft 27, its output is manually selected by the selector 98a to produce a proper dynamic pressure which appears in the control chamber 81. The fluid which passes through the control chamber 81 is led through the pump 96 which serves primarily as a metering device, or as a tachometer, for returning the fluid to the pump 95. However, if the motor 86 is turning at an improper speed, the pump or tachometer 96 will alter the pressure in the chamber 81 to correct the condition as above described. Thus by repositioning the control or selector 98a, the controlled speed of the motor 86 and hence the rotation of the control gear 34 may be varied, thereby changing the speed ratio between the line shaft 12 and the drive shaft 27. Where the connection between the line shaft 12 and the variable speed mechanism is positive, a constant speed ratio is obtained therebetween for any setting of the selector 98a.

The pump 80 draws its fluid from a sump 106. A typical pump of the type used as pump 80 requires a pressurized source of fluid to prevent cavitation. Accordingly, we have provided an auxiliary pump 102 for this purpose whereby the pump 80 is pressurized through a line 103. The pump 102 is driven by a motor 104. Of course, power to drive the pump 102 may also be provided directly from the line shaft 12. Further, certain commercially available pumps such as pump 80 include the pump 102 as an internal gear pump integral within the housing of the pump 80. The line 105 also pressurizes the pumps 95 and 96 or provides a back pressure for them. By this arrangement, any volumetric changes within the lines interconnecting the pumps 95 and 96 are compensated for, such as changes due to temperature, leakage, change of displacement, and the like. It will be noted that the line 105 leads to the line 100, remotely from the lines 98, 99. Each of the motor 86, the pumps 95 and 96 are provided with a drain port which leads to the sump 106, the tubing having been omitted from the drawing to avoid confusion.

By this arrangement, if the speed of the line shaft 12 is increased, such as during start-up, the output of the pump 80 would increase and drive the motor 86 and pump 96 at a faster rate. This tends to lower the pressure in the chamber 81, but the pump 95 is simultaneously driven at a higher rate which therefore maintains the pressure in the chamber 81. Thus the setting of the pump 80 remains unchanged during speed variations of the line shaft, and therefore the ratio of the entire mechanism holds constant.

Each section of a paper machine may be provided with a drive mechanism in accordance with this invention, and successive sections operated at slightly faster rates to produce a draw on the web. Once the various section speeds have been established by proper setting of each drive mechanism, at any line shaft speed, the proper ratio of draw on the web between sections will be automatically maintained, thereby permitting simultaneous start-ups of an entire machine, or speed changes thereof, the various drive mechanisms being driven by a common line shaft.

With reference to FIGURE 2, it is to be understood that the structural details of the speed varying apparatus 11a do not form a part of the instant invention. However, a preferred embodiment of this invention includes a stepless variable speed unit or element having pulley wheels with either smooth or toothed contact surfaces or faces engaged by a belt or chain of appropriate construction, and more preferably includes the positively engaging type employing the toothed contact surfaces. Reference may be had to U.S. Patent No. 2,329,911 and to other patents referenced therein for further teaching relative to this type of apparatus.

While protection and regulation of the clutch is discussed herein, it is of course understood that one of the reasons for which the clutch itself is provided is the protection of the drive mechanism, with which it is associated against excessive loads.

Although various modifications might be suggested by those versed in the art, it should be understood that we wish to embody within the scope of the patent warranted hereon all such embodiments as reasonably and properly come within our contribution to the art.

We claim as our invention:

1. In a gear-type drive mechanism having a clutch operative therewith, the improvement of a clutch control, said control comprising: a pair of engaging helical gears comprising an intermediate part of said mechanism; a pair of shafts rigidly supporting said gears, one of said shafts being free to shift axially in opposite directions as a function of torque transmitted thereby; means responsive to the axial position of said one shaft for proportionately converting said axial shift into a variable fluid pressure signal which increases in response to a torque increase; and means for directing said fluid pressure signal to said clutch for varying its torque transmitting capacity as an inverse function of the torque.

2. In a drive mechanism including a source of fluid pressure, a fluid drive motor rotatably driven thereby, and a clutch rotatably driven by said motor, the improvement of a clutch control, said control comprising: means for sensing the pressure drop across the motor; and means connected to said sensing means and the clutch, and responsive to a predetermined magnitude of said pressure drop and operative to vary the torque transmitting capacity of the clutch inversely with said pressure drop, thereby permitting the clutch to slip when an excessive load is applied thereto, and permitting the clutch to be positively engaged when a normal load is applied.

3. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive powered by the line shaft and connected to said control element; means for providing a signal proportional to the torque transmitted to said control element; and means for directing said signal to the clutch for varying its torque transmitting capacity.

4. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive powered by the line shaft and connected to said control element; a pair of helical gears in series with said variable speed drive, one of said gears being proportionately axially shiftable in response to torque transmitted to said control element; means for proportionately converting said axial shift to a signal; and means for directing said signal to the clutch for varying its torque transmitting capacity.

5. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive including a variable delivery fluid pump connected to the line shaft member, and a fluid motor driven by said pump and connected to said control element; and means responsive to the pressure drop across said motor and operative on said clutch for varying its torque transmitting capacity.

6. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive including a variable delivery fluid pump having a pressure responsive delivery control and driven by the line shaft member, a fluid motor driven by said pump and connected to said control element, a selectable capacity control pump driven by the line shaft, and a constant delivery control pump driven by said control element, the discharge of each of said control pumps being connected by a pair of lines to the inlet of the other control pump to circulate fluid, one of said lines communicating with said pressure responsive delivery control, and the other of said lines communicating with a sump; whereby upon occurrence of a speed variation of the line shaft member, the output pressures of said control pumps change together and hence do not alter the pressure on said pressure responsive delivery control.

7. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive including a variable delivery fluid pump having a pressure responsive delivery control and driven by the line shaft member, a fluid motor driven by said pump and connected to said control element, a selectable capacity control pump driven by the line shaft, and a constant delivery control pump driven by said control element, the discharge of each of said control pumps being connected by a pair of lines to the inlet of the other control pump to circulate fluid, one of said lines communicating with said pressure responsive delivery control, and the other of said lines communicating with a sump; whereby upon occurrence of a speed variation of the line shaft member, the output pressures of said control pumps do not change and hence do not alter the pressure on said pressure responsive delivery control; and means responsive to the pressure drop across said motor and operative on said clutch for varying its torque transmitting capacity, thereby preventing overloading or slipping of the clutch.

8. A method for protecting a driven fluid-pressure-actuated clutch actuated by a first fluid pressure against excessive torque comprising: obtaining a fluid pressure signal of a second fluid pressure which signal is in direct response to the torque as it is being transmitted to the clutch, and using the pressure signal to effect offsetting of said first fluid pressure, thereby allowing the clutch to slip.

9. A method for varying the torque transmitting capacity of a fluid-pressure-actuated clutch driven by a gear mechanism comprising: converting an axial thrust load in the gear mechanism which drives the clutch to an equivalent fluid pressure signal, and using the pressure signal to proportionately vary the actuating pressure at the clutch.

10. A method for varying the torque transmitting capacity of a fluid-pressure-actuated clutch rotatably driven by a rotatable fluid motor, comprising: Sensing the pressure drop across the motor, and utilizing the pressure drop to effect varying of the fluid pressure at the clutch.

11. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive including a variable delivery fluid pump having a pressure responsive delivery control and driven by the line shaft member, a fluid motor driven by said pump and connected to said control element, a selectable capacity control pump driven by the line shaft, and a fluid tachometer corotatable with said control element, the discharge of said control pump being directed through the tachometer and said pressure responsive delivery control for recirculation through said control pump, the side of said control pump remote from said delivery control communicating with a sump; whereby said tachometer alters the pressure at said pressure-responsive delivery control produced by said control pump, to vary the speed of said variable delivery pump, to vary the torque input by said motor, and to match the capacity of the tachometer with the control pump.

12. In a paper machine having a driven variable speed line shaft member, a drive mechanism for a section of the machine having a driving member, said mechanism comprising in combination: a housing; a clutch connected to the driving member; a differential gearing assembly within said housing and having three rotary elements, the first of said elements being connected to the line shaft member, the second of said elements being connected to said clutch, and the third of said elements being a control element; a variable speed drive including a variable delivery fluid pump having a pressure responsive delivery control and driven by the line shaft member, a fluid motor driven by said pump and connected to said control element, a selectable capacity control pump driven by the line shaft, and a fluid tachometer corotatable with said control element, the discharge of said control pump being directed through the tachometer and said pressure responsive delivery control for recirculation through said control pump, the side of said control pump remote from said delivery control communicating with a sump; whereby said tachometer alters the pressure at said pressure-responsive delivery control produced by said control pump, to vary the flow-rate of said variable delivery pump, to vary the torque input by said motor, and to match the capacity of the tachometer with the control pump; and means responsive to the pressure drop across said motor and operative on said clutch for varying its torque transmitting capacity, thereby preventing overloading or slipping of the clutch.

13. A method for controlling the torque capacity of a driven fluid-pressure-actuated clutch comprising: providing a first fluid pressure to engage the clutch; sensing the torque as it is being transmitted to the clutch as a proportionate fluid pressure signal comprising a second fluid pressure; and utilizing the second fluid pressure signal to relieve the first fluid pressure to effect decrease in the torque capacity of the clutch in response to a transmitted torque increase.

14. In a paper machine having a driven variable speed line shaft member, a drive mechanism for a section of the machine having a driving member, said mechanism comprising in combination: a housing; a differential gearing assembly within said housing and having three rotary elements, the first of said elements having a connection for being driven by the line shaft member, the second of said elements being drivably connected to said driving member, and the third of said elements being a control element; a variable speed drive including a driven variable delivery fluid pump having a pressure responsive delivery control, a fluid motor driven by said pump and drivably connected to said control element, a selectable capacity control pump driven by the line shaft, and a constant delivery control pump driven by said control element, the discharge of each of said control pumps being connected by a pair of lines to the inlet of the other control pump to circulate fluid, one of said lines communicating with said pressure responsive delivery control; whereby upon occurrence of a speed variation of the line shaft member, the output pressures of said control pumps change together and hence do not alter the pressure on said pressure responsive delivery control.

15. In a paper machine having a driven variable speed line shaft member, a drive mechanism for a section of the machine having a driving member, said mechanism comprising in combination: a housing; a differential gearing assembly within said housing and having three rotary elements, the first of said elements having a connection for being driven by the line shaft member, the second of said elements being drivably connected to said driving member, and the third of said elements being a control element; a variable speed drive including a driven variable delivery fluid pump having a pressure responsive delivery control, a fluid motor driven by said pump and drivably connected to said control element, a selectable capacity control pump driven by the line shaft, and a fluid tachometer jointly rotatable with said control element, the discharge of said control pump being directed through the tachometer and said pressure responsive delivery control for recirculation through said control pump; whereby said tachometer alters the pressure at said pressure-responsive delivery control produced by said control pump, to vary the speed of said variable delivery pump, to vary the torque input by said motor, and to match the capacity of the tachometer with the control pump.

16. In a drive mechanism having a clutch operative therewith provided with a fluid pressure actuator, and a fluid pressure source connected to the clutch actuator for normally maintaining the clutch in an engaged condition, the improvement of a clutch control, said control comprising: means for obtaining a fluid pressure signal which is independent of fluid pressure acting on the clutch actuator, and which is a direct function of the torque transmitted by the drive mechanism; and means responsive to an increase in said fluid pressure signal and operative to relieve the fluid pressure acting on said clutch actuator.

17. In a drive mechanism having a clutch operative therewith provided with a fluid pressure actuator, and a fluid pressure source connected to the clutch actuator for normally maintaining the clutch in an engaged condition, the improvement of a clutch control, said control comprising: means for obtaining an infinitely variable fluid pressure signal which is independent of fluid pressure acting on the clutch actuator, and which is a direct function of the torque transmitted by the drive mechanism; and means responsive to an increase in said fluid pressure signal and operative to proportionately decrease the fluid pressure acting on said clutch actuator.

18. In combination: a variably engageable clutch having an actuator; a drive mechanism including two coacting branches for transmitting driving torque to one side of said clutch and drivingly connected thereto, one of said branches being variable as to the proportion of driving torque transmitted thereby to said clutch; the other side of said clutch being adapted to be connected to a load; and a clutch control, said control including means for obtaining a signal in response to torque transmitted by the variable branch, and means for directing said signal to the clutch actuator for varying its torque transmitting capacity and hence the capacity of such clutch to deliver power from both of said branches.

19. In combination: a variably engageable clutch having an actuator; a drive mechanism including two coacting branches for transmitting driving torque to one side of said clutch and drivingly connected thereto, one of the branches transmitting a substantially lesser amount of torque than the other branch; the other side of said clutch being adapted to be connected to a load; and a clutch control, said control including means for obtaining a signal in response to the torque which is transmitted by the branch transmitting the lesser amount of torque, and means for directing said signal to the clutch actuator for varying its torque transmitting capacity and hence the capacity of said clutch to deliver power from both of said branches.

20. In a drive mechanism including a source of fluid pressure, a fluid drive motor rotatably driven thereby, and a power actuated clutch rotatably driven by said motor, the improvement in combination therewith of a clutch control, said control comprising: means for obtaining a signal in response to the pressure drop across the fluid drive motor; a control member connected to said means and responsive to said signal; and means for directing power under the control of said control member to the power actuated clutch for varying the torque transmitting capacity of said clutch.

21. In a drive mechanism including a source of fluid pressure, a fluid drive motor rotatably driven thereby, and a fluid actuated clutch rotatably driven by said motor, the improvement in combination therewith of a clutch control, said control comprising: means for obtaining a fluid pressure signal in response to and proportional to the pressure drop across the motor; a control member connected to said means and responsive to said fluid pressure signal; and means for directing a fluid pressure under the control of said control member to the fluid actuated clutch for varying the torque transmitting capacity of said clutch.

References Cited in the file of this patent

UNITED STATES PATENTS

| | | |
|---|---|---|
| 1,619,703 | Charlton | Mar. 1, 1927 |
| 2,120,714 | Scott | June 14, 1938 |
| 2,151,493 | Acker | Mar. 21, 1939 |
| 2,600,269 | Saives | June 10, 1952 |
| 2,796,222 | Frankel | June 18, 1957 |
| 2,909,275 | Hitchcock | Oct. 10, 1959 |
| 2,918,154 | Scherenberg et al. | Dec. 22, 1959 |
| 3,045,789 | Beeskow | July 24, 1962 |

FOREIGN PATENTS

| | | |
|---|---|---|
| 421,204 | Great Britain | Dec. 17, 1934 |